United States Patent
Younes et al.

(10) Patent No.: US 10,131,758 B2
(45) Date of Patent: Nov. 20, 2018

(54) POLYURETHANE FOAM-FORMING COMPOSITIONS, METHODS OF MAKING LOW DENSITY FOAMS USING SUCH COMPOSITIONS, AND FOAMS FORMED THEREFROM

(71) Applicant: ACCELLA POLYURETHANE SYSTEMS, LLC, Maryland Heights, MO (US)

(72) Inventors: Usama Younes, McMurray, PA (US); Richard Romero, The Woodlands, TX (US); Kenneth Riddle, Ambridge, PA (US); Timothy Pike, Bethel Park, PA (US)

(73) Assignee: ACCELLA POLYURETHANE SYSTEMS, LLC, Maryland Heights, MO (US)

( * ) Notice: Subject to any disclaimer, the term of this patent is extended or adjusted under 35 U.S.C. 154(b) by 72 days.

(21) Appl. No.: 15/218,632

(22) Filed: Jul. 25, 2016

(65) Prior Publication Data

US 2018/0022885 A1  Jan. 25, 2018

(51) Int. Cl.

| | |
|---|---|
| *B05D 1/02* | (2006.01) |
| *C08G 18/08* | (2006.01) |
| *C08G 18/16* | (2006.01) |
| *C08G 18/20* | (2006.01) |
| *C08G 18/22* | (2006.01) |
| *C08G 18/32* | (2006.01) |
| *C08G 18/40* | (2006.01) |
| *C08G 18/42* | (2006.01) |
| *C08G 18/48* | (2006.01) |
| *C08G 18/66* | (2006.01) |
| *C08G 18/76* | (2006.01) |
| *C08J 9/14* | (2006.01) |
| *C08J 9/228* | (2006.01) |
| *E04B 1/74* | (2006.01) |
| *C08G 101/00* | (2006.01) |

(52) U.S. Cl.
CPC ............... *C08J 9/144* (2013.01); *B05D 1/02* (2013.01); *C08G 18/14* (2013.01); *C08G 18/163* (2013.01); *C08G 18/2081* (2013.01); *C08G 18/227* (2013.01); *C08G 18/3281* (2013.01); *C08G 18/4018* (2013.01); *C08G 18/4202* (2013.01); *C08G 18/4208* (2013.01); *C08G 18/4219* (2013.01); *C08G 18/4883* (2013.01); *C08G 18/6622* (2013.01); *C08G 18/7664* (2013.01); *C08G 18/7671* (2013.01); *C08J 9/228* (2013.01); *E04B 1/74* (2013.01); *C08G 2101/005* (2013.01); *C08G 2101/0025* (2013.01); *C08J 2201/022* (2013.01); *C08J 2203/142* (2013.01); *C08J 2203/162* (2013.01); *C08J 2207/00* (2013.01); *C08J 2375/04* (2013.01); *C08J 2375/06* (2013.01)

(58) Field of Classification Search
CPC ............ C08G 18/4202; C08G 18/4208; C08G 18/42; C08G 18/4204
See application file for complete search history.

(56) References Cited

U.S. PATENT DOCUMENTS

| | | |
|---|---|---|
| 3,823,097 A | 7/1974 | Allen et al. |
| 4,430,490 A | 2/1984 | Doerge |
| 4,945,120 A | 7/1990 | Kopp et al. |
| 5,137,930 A | 8/1992 | Soukup |
| 5,407,967 A | 4/1995 | Williams et al. |
| 5,786,409 A * | 7/1998 | Kurple ............ B22C 1/02 523/142 |
| 7,160,930 B2 | 1/2007 | Sparks et al. |
| 8,314,159 B2 | 11/2012 | Chen et al. |
| 8,552,079 B2 | 10/2013 | Clatty et al. |
| 8,937,107 B2 | 1/2015 | Singh et al. |
| 9,228,071 B2 | 1/2016 | Chen et al. |
| 9,234,070 B2 | 1/2016 | Chen et al. |
| 9,279,039 B2 | 3/2016 | Chen et al. |
| 2002/0040122 A1 | 4/2002 | Mirasol et al. |
| 2003/0068490 A1 | 4/2003 | Kaplan |
| 2004/0157945 A1 | 8/2004 | Barber |
| 2004/0162359 A1 | 8/2004 | Barber et al. |
| 2006/0047011 A1 | 3/2006 | Kusan-Bindels et al. |
| 2006/0084709 A1 | 4/2006 | Dobransky |
| 2007/0010592 A1 | 1/2007 | Bowman et al. |
| 2012/0248371 A1* | 10/2012 | Ross ............ C08J 9/146 252/182.15 |
| 2013/0190415 A1 | 7/2013 | Burdeniuc et al. |
| 2015/0051304 A1 | 2/2015 | Shieh |
| 2015/0299373 A1 | 10/2015 | Nefzger et al. |
| 2017/0174964 A1* | 6/2017 | Bergherm ............ C09K 3/149 |

* cited by examiner

*Primary Examiner* — Melissa A Rioja
(74) *Attorney, Agent, or Firm* — Harness, Dickey & Pierce, P.L.C.

(57) ABSTRACT

Disclosed are polyurethane foam-forming compositions with a phase stable isocyanate-reactive composition that includes a halogenated olefin blowing agent that has low or no ozone depletion potential and low global warming potential. Such polyurethane foam-forming compositions are suitable for spray application to produce polyurethane foams that are believed to exhibit good fire resistance properties, low smoke generation and low or no scorch due to reduced exotherm, thereby making them particularly suitable for use, for example, as relatively thick wall and/or roof insulation.

17 Claims, No Drawings

POLYURETHANE FOAM-FORMING COMPOSITIONS, METHODS OF MAKING LOW DENSITY FOAMS USING SUCH COMPOSITIONS, AND FOAMS FORMED THEREFROM

FIELD

The present invention relates to polyurethane foam-forming compositions with a phase stable isocyanate-reactive composition that includes a halogenated olefin blowing agent that has low or no ozone depletion potential and low global warming potential. Such polyurethane foam-forming compositions are suitable for spray application to produce polyurethane foams that are believed to exhibit good fire resistance properties, low smoke generation and low or no scorch due to reduced exotherm, thereby making them particularly suitable for use, for example, as relatively thick wall and/or roof insulation.

BACKGROUND

Spray polyurethane foams (SPFs) are often formed by combining an isocyanate-reactive component and a polyisocyanate in the presence of water and a physical blowing agent. Aromatic polyester polyols and/or sucrose-based polyether polyols are often used in the polyol component. Such polyols are often selected for SPF applications, such as wall or roof insulation applications, because of the fire resistance properties they tend to impart to the foam.

Historically, the physical blowing agents used in SPFs have often been chlorofluorocarbons (CFCs) and hydrochlorofluorocarbons (HCFCs). CFCs and HCFCs are, however, becoming disfavored because of their ozone depletion potential and relatively high global warming potential. As a result, alternative physical blowing agents are under consideration.

One class of alternative physical blowing agents with low or no ozone depletion potential and low global warming potential are certain halogenated olefins, such as fluoroolefins, that include at least one halogen, such as fluorine, and at least one carbon-carbon double bond. Some of these fluoroolefins also include hydrogen and at least one chlorine atom and, as a result, are sometimes referred to as hydrochlorofluoroolefins or HFCOs.

Phase stability of the isocyanate-reactive component is particularly important for SPFs, because phase instability resulting in any precipitates or deposits can cause equipment damage. In addition, phase instability can lead to metering accuracy problems during the spray application process which can affect the stoichiometry of the resulting polyurethane spray system, resulting in poor reactivity and poor foam performance properties.

As a result, it would be desirable to provide polyurethane foam-forming compositions with a phase stable isocyanate-reactive composition that includes a halogenated olefin blowing agent that has low or no ozone depletion potential and low global warming potential, such polyurethane foam-forming compositions being suitable for spray application to produce polyurethane foams with good fire resistance properties, low smoke generation, and low or no scorch due to reduced exotherm, thereby making them particularly suitable for use, for example, as relatively thick wall and/or roof insulation.

The present invention was made in view of the foregoing desire.

SUMMARY

In certain respects, the present invention is directed to polyurethane foam-forming compositions that comprise a polyisocyanate and an isocyanate-reactive composition. The isocyanate-reactive composition in such foam-forming compositions comprises: (1) at least 50% by weight, based on the total weight of isocyanate-reactive components in the isocyanate-reactive composition, of an aromatic polyester polyol; (2) water; and (3) a $C_2$ to $C_6$ halogenated olefin, wherein the isocyanate-reactive composition exhibits no visible cloudiness or gels after aging the isocyanate-reactive composition for 7 days at 50° C.

In other respects, the present invention is directed to polyurethane foam-forming compositions that comprise a polyisocyanate and an isocyanate-reactive composition. The isocyanate-reactive composition in such foam-forming compositions comprises: (1) at least 50% by weight, based on the total weight of isocyanate-reactive components in the isocyanate-reactive composition, of a phthalic anhydride based polyester polyol; (2) water; and (3) a $C_2$ to $C_6$ halogenated olefin.

The present invention is also directed to, among other things, methods of making a low density polyurethane foam by spray application of such foam-forming compositions, low density polyurethane foams formed by such methods, and appliances and/or buildings insulated with such foams.

DETAILED DESCRIPTION

Various embodiments are described in this specification to provide an overall understanding of the structure, function, operation, manufacture, and use of the disclosed products and processes. It is understood that the various embodiments described and illustrated in this specification are non-limiting and non-exhaustive. Thus, the invention is not limited by the description of the various non-limiting and non-exhaustive embodiments disclosed in this specification. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112, first paragraph, and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "certain embodiments," or the like, means that a particular feature or characteristic may be included in an embodiment. Thus, use of the phrase "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification. In this manner, the various embodiments described in this specification are non-limiting and non-exhaustive.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, and without limitation, "a flame retardant" means one or more flame retardants, and thus, possibly, more than one flame retardant is contemplated and may be employed or used in an implementation of the described embodiments. Further, the use of a singular noun includes the plural, and the use of a plural noun includes the singular, unless the context of the usage requires otherwise.

As indicated, certain embodiments of the present invention are directed to polyurethane foam-forming compositions that comprise a polyisocyanate. Any of the known organic polyisocyanates may be used in the present invention. Suitable polyisocyanates include aromatic, aliphatic and cycloaliphatic polyisocyanates and combinations thereof. Representative of these types are diisocyanates, such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, pentamethylene 1,5-diisocyanate, the isomers of hexahydrotoluene diisocyanate, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, and 3,3'-dimethyldiphenylpropane-4,4'-diisocyanate; triisocyanates, such as 2,4,6-toluene triisocyanate; and polyisocyanates, such as 4,4'-dimethyl-diphenylmethane-2,2',5,5'-tetraisocyanate and the polymethylene polyphenylisocyanates.

A crude polyisocyanate may be used, such as the crude toluene diisocyanate obtained by the phosgenation of a mixture of toluene diamines. Similarly, undistilled polyisocyanates, such as methylene bridged polyphenyl-polyisocyanates can be used and can be obtained by phosgenation of polyphenylpolymethylenepolyamines obtained by the condensation of aromatic amines, such as aniline, with formaldehyde.

Suitable modified polyisocyanates may be obtained by chemical reaction of polyisocyanates and can include, without limitation, isocyanates containing ester groups, urea groups, biuret groups, allophanate groups, carbodiimide groups, isocyanurate groups, uretdione groups and/or urethane groups.

In certain embodiments, the polyisocyanate comprises a methylene-bridged polyphenyl polyisocyanate and/or a prepolymer of a methylene-bridged polyphenyl polyisocyanate having an average functionality of 2.0 to 3.5, such as 2.1 to 3.1, isocyanate moieties per molecule, and a free NCO content of 15 to 35% by weight, such as 20 to 35% by weight, 25 to 35% by weight or, in some cases, 28 to 34% by weight. In certain embodiments, such methylene-bridged polyphenyl polyisocyanate and/or a prepolymer of a methylene-bridged polyphenyl polyisocyanate is present in an amount of at least 50% by weight, such as at least 80% by weight, at least 90% by weight, or at least 99% by weight, based on the total weight of polyisocyanate.

The polyurethane foam-forming compositions of the present invention also comprise an isocyanate-reactive composition. As used herein, the term "isocyanate-reactive composition" refers to a composition that comprises, among other things, components that have functional groups that are reactive with isocyanate groups, i.e., the isocyanate-reactive components defined below. The isocyanate-reactive composition includes, among other things, at least 50% by weight, based on the total weight of the isocyanate-reactive composition, of an aromatic polyester polyol. Moreover, in some cases, the isocyanate-reactive composition exhibits no visible cloudiness or gels after aging for 7 days at 50° C.

In certain embodiments, the isocyanate-reactive composition comprises at least 50% by weight, based on the total weight of isocyanate-reactive components in the isocyanate-reactive composition, of a phthalic anhydride based polyester polyol. As used herein, the term "phthalic anhydride based polyester polyol" refers to a polycondensation reaction product of a polyol and a dicarboxylic acid and/or anhydride thereof comprising phthalic anhydride, in some cases, wherein the dicarboxylic acid and/or anhydride thereof consists essentially of or, in yet other cases, consists of phthalic anhydride. Phthalic anhydride, as used herein, refers to a compound of the structure:

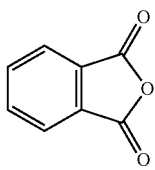

As used herein, the term "consists essentially of" when used in the context of the immediately preceding paragraph, means that any dicarboxylic acids and/or anhydrides thereof, aside from phthalic anhydride, that are used in the polycondensation reaction are not used in an amount sufficient to materially affect the phase stability of the isocyanate-reactive composition. As such, if any such other dicarboxylic acids and/or anhydrides thereof are present, they are not present in an amount sufficient to cause the isocyanate-reactive composition to exhibit visible cloudiness and/or gels after aging the isocyanate-reactive composition for 7 days at 50° C.

For purposes of the present invention, phthalic anhydride based polyester polyols are to be distinguished from other aromatic polyester polyols, such as terephthalate based polyester polyols. Thus, in certain embodiments, the dicarboxylic acid and/or anhydride thereof used in the foregoing polycondensation reaction is substantially or, in some cases, completely free of terephthalate, such as polyethylene terephthalate and/or dimethyl terephthalate. Also, in certain embodiments of the present invention, the isocyanate-reactive composition is substantially free, or, in some cases, completely free of aromatic polyester polyols that are not phthalic anhydride based polyester polyols. As used herein, "substantially free" when used with reference to the substantial absence of non-phthalic anhydride based aromatic polyester polyols, means that such aromatic polyester polyols are present in an amount of no more than 10% by weight, such as no more than 2% by weight, or, in some cases, no more than 1% by weight, based on the total weight of aromatic polyester polyols present.

Polyols suitable for reaction with phthalic anhydride in the foregoing polycondensation reaction include, without limitation, di- and higher functional polyols having a molecular mass of from 62 g/mol to 400 g/mol. Specific examples of such polyols include, without limitation, 1,4-dihydroxycyclohexane, 1,2-propanediol, 1,3-propanediol, 2-methyl-1,3-propanediol, 1,5-pentanediol, 1,6-hexanediol, 1,8-octanediol, neopentyl glycol, ethylene glycol, diethylene glycol, triethylene glycol, tetraethylene glycol, dipropylene glycol, tripropylene glycol, dibutylene glycol, tripropylene glycol, glycerol, pentaerythritol and/or trimethylolpropane, including mixtures of two or more of any of the foregoing.

The polycondensation reaction may, if desired, be performed in the presence of a suitable catalyst and can, if desired, be carried out at reduced pressure and elevated temperature with the simultaneous removal by distillation of the water, or low molecular weight alcohol, that is formed. The polycondensation reaction also can take place by an azeotropic process in the presence of an organic solvent as entrainer or by a carrier gas process. In certain embodiments, the reaction temperature during the polycondensation is within the range of 150° C. to 250° C., such as 180° C. to 230° C.

In certain embodiments, the phthalic anhydride based polyester polyol has an acid number of less than 5 mg KOH/gram polyol, such as less than 4 mg KOH/gram polyol.

In certain embodiments, the phthalic anhydride based polyester polyol has a hydroxyl number of at least 290 mg KOH/gram polyol, such as 290 to 500 mg/KOH gram polyol, 290 to 400 mg KOH/gram polyol, or 290 to 360 mg KOH/gram polyol. In certain embodiments, the isocyanate-reactive composition may comprise two or more phthalic anhydride based polyester polyols, wherein the weighted average hydroxyl number of the phthalic anhydride based polyester polyols is 290 to 350 mg KOH/gram polyol, such as 290 to 320 mg KOH/gram polyol or 300 to 320 mg KOH/gram polyol. For purposes of the present invention, hydroxyl number can be determined experimentally via esterification followed by back-titration of the excess esterification reagent with standard alcoholic potassium hydroxide solution according to DIN 53240-2.

In certain embodiments, the phthalic anhydride based polyester polyol has an OH functionality of 2 to 6, such as 2 to 3, or, in some cases, 2.1 to 2.4. The OH functionality referred to herein is the theoretical average nominal functionality of the polyol, i.e., the functionality calculated based on the average number of hydroxyl groups per molecule of OH functional reactant used to produce the polyol.

As will be appreciated, the number average molecular weight ($M_n$) of polyols used in the present invention can be calculated from the OH functionality and hydroxyl number of the polyol according to the equation:

$$M_n = \frac{56100 * f}{\text{OH\#}}$$

in which f is the OH functionality and OH# is the hydroxyl number. In certain embodiments, the phthalic anhydride polyester polyol has a $M_n$ of 200 to 1000 gram/mole, such as 300 to 500 gram/mole or 350 to 450 gram/mole.

In certain embodiments of the present invention, the phthalic anhydride based polyester polyol comprises a mixture of two or more phthalic anhydride based polyester polyols. For example, in some embodiments, the phthalic anhydride based polyester polyol comprises (i) a first phthalic anhydride based polyester polyol having a hydroxyl number of 290 to 310 mg KOH/gram polyol and a OH functionality of 2.0 to 2.2, such as 2.1, and (ii) a second phthalic anhydride based polyester polyol having a hydroxyl number of 340 to 360 mg/KOH gram polyol and a OH functionality of 2.3 to 2.5, such as 2.4. In certain of these embodiments, first phthalic anhydride based polyester polyol (i) is present in an amount of 50% to 99% by weight, such as 70% to 90% by weight, or in some cases, 75% to 85% by weight, based on the combined weight of (i) and (ii). In these embodiments, the second phthalic anhydride based polyester polyol (ii) is present in an amount of 1% to 50% by weight, such as 10% to 30% by weight, or in some cases, 15% to 25% by weight, based on the combined weight of (i) and (ii).

In certain embodiments, the foregoing phthalic anhydride based polyester polyol is present in an amount of at least 50% by weight, based on the total weight of isocyanate-reactive components in the isocyanate-reactive composition. As used herein, "isocyanate-reactive component" means any compound that contains a functional group that is reactive with an isocyanate group, examples of which include amino groups, thiol groups, carboxyl groups, and hydroxyl groups. In certain embodiments, phthalic anhydride based polyester polyol is present in an amount of at least 60% by weight, at least 70% by weight, or, in some cases at least 80% by weight, based on the total weight of isocyanate-reactive components in the isocyanate-reactive composition. Further, in certain embodiments, phthalic anhydride based polyester polyol is present in an amount such that the phthalic anhydride based polyester polyol provides at least 50%, such as at least 60%, or, in some cases, at least 70% of all of the isocyanate-reactive groups present in the isocyanate-reactive composition, based on the total moles of isocyanate-reactive groups, such as —OH groups, present in the composition. Moreover, in certain embodiments, phthalic anhydride based polyester polyol is present in an amount of at least 15% by weight, such as at least 20% by weight, such as 20 to 40% by weight, or 25 to 35% by weight, based on the total weight of the polyurethane foam-forming composition.

It was a surprising discovery that use of such phthalic anhydride based polyester polyols as the predominate source, i.e., in the amounts described in the immediately preceding paragraph, of isocyanate-reactive component in the isocyanate-reactive composition had a considerable advantage in the phase stability of the isocyanate-reactive compositions disclosed herein, which include a halogenated olefin blowing agent, as compared isocyanate-reactive compositions that do not include such a predominance of phthalic anhydride based polyester polyols, such as those that predominantly utilize other types of aromatic polyester polyols, such as terephthalate based polyester polyols. As a result, certain embodiments of the present invention are directed to polyurethane foam-forming composition comprising an isocyanate-reactive composition that is phase stable, which, as used herein, means that the isocyanate-reactive composition exhibits no visible cloudiness and/or gels after aging the isocyanate-reactive composition for 7 days at 50° C.

This advantage in phase stability is such that the isocyanate-reactive compositions, which have the advantage of utilizing low or no ozone depletion potential and low global warming potential halogenated olefin blowing agents, are believed to be viable for effective use in SPF applications. Moreover, the resulting polyurethane foams are believed to exhibit good fire resistance properties, low smoke generation, low or no scorch due to reduced exotherm, thereby making them particularly suitable for use, for example, as relatively thick building insulation without causing significant difficulties with respect to equipment damage and metering accuracy problems during the spray application process.

The isocyanate-reactive compositions of the polyurethane foam-forming compositions of the present invention can also comprise other isocyanate-reactive components. For example, in certain embodiments, the isocyanate-reactive composition comprises a sucrose-based polyol.

As used herein, "sucrose" refers to a crystalline disaccharide having D-fructosyl and D-glucosyl moieties, having the structure:

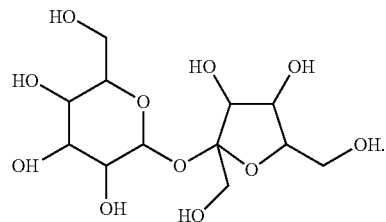 [SMILES: OCC1OC(OC2(CO)OC(CO)C(O)C2O)C(O)C(O)C1O]

The sucrose-based polyol employed in certain embodiments of the polyurethane foam-forming compositions of the present invention is, in some cases, a polyether polyol prepared, for example, by reacting sucrose and optionally one or more other polyhydric alcohol initiators, such as propylene glycol (with or without water) with an alkylene oxide, such as ethylene oxide and/or propylene oxide and/or butylene oxide, in the presence of an alkaline catalyst, such as sodium hydroxide and/or potassium hydroxide. The product may, of course, be treated with an acid, such as a hydroxy-carboxylic acid, to neutralize the alkaline catalyst. A suitable process for preparing such sucrose-based polyols is described in U.S. Pat. No. 4,430,490 at col. 2, line 25 to col. 3, line 7, the cited portion of which being incorporated herein by reference.

In certain embodiments, the sucrose-based polyol has a hydroxyl number of 400 to 1000 mg KOH/gram polyol, such as 400 to 800 mg KOH/gram polyol, 400 to 600 mg KOH/gram polyol, or, in some cases 400 to 500 mg KOH/gram polyol or 450 to 500 mg KOH/gram polyol. In certain embodiments, the sucrose-based polyol has OH functionality of at least 5.0, such as 5.0 to 7.7, 5.0 to 7.0, 5.0 to 6.0, or, in some cases 5.0 to 5.5 or 5.0 to 5.4. In certain embodiments, the sucrose-based polyol has a $M_n$ of 200 to 1100 gram/mole, such as 350 to 1080 gram/mole, 470 to 840 gram/mole, 560 to 770 gram/mole, or, in some cases, 560 to 660 gram/mole.

In certain embodiments, the foregoing sucrose-based polyol is present in an amount of 1 to 20% by weight, such as 1 to 10% by weight, or, in some cases 5 to 10% by weight, based on the total weight of isocyanate-reactive components in the isocyanate-reactive composition. In certain embodiments, the foregoing sucrose-based polyol is present in an amount such that the sucrose-based polyol provides 1 to 20%, such as 5 to 15%, or, in some cases, 8 to 12% of all of the isocyanate-reactive groups present in the isocyanate-reactive composition, based on the total moles of isocyanate-reactive groups, such as —OH groups, present in the composition. Moreover, in certain embodiments, sucrose-based polyol is present in an amount of at least 1% by weight, such as at least 2% by weight, such as 1 to 10% by weight, or 2 to 5% by weight, based on the total weight of the polyurethane foam-forming composition.

Mannich polyols are also suitable for inclusion in the polyurethane foam-forming compositions. As will be appreciated, Mannich polyols are aromatic polyols obtained by alkoxylation of Mannich bases obtained by the Mannich reaction between phenols, formaldehyde and alkanolamines with alkylene oxides, such as ethylene oxide and/or propylene oxide. In certain embodiments, such Mannich polyols have an OH functionality of at least 3.0. Common Mannich polyols that can be used with the present invention include those that are initiated with phenol or nonyl-phenol or other suitable phenol derivatives.

In some embodiments of the present invention, Mannich polyol is present in an amount of up to 20% by weight, based on the total weight of isocyanate-reactive components in the isocyanate-reactive composition. In some of these embodiments, Mannich polyol, if present, is present in an amount of less than 10% by weight, less than 5% by weight, or, in some cases, less than 2% by weight, based on the total weight of isocyanate-reactive components in the isocyanate-reactive composition.

If desired, the isocyanate-reactive composition may comprise other polyether polyols, such as, for example, amine-initiated polyether polyols. In some embodiments, however, the isocyanate-reactive composition is substantially or, in some cases, completely free, of amine-initiated polyether polyols. As used herein, "substantially free", when used with reference to the absence of amine-initiated polyether polyols in the isocyanate-reactive composition, means the amine-initiated polyether polyol is present, if at all, in an amount of less than 10% by weight, such as no more than 5% by weight, no more than 2% by weight, or, in some cases, no more than 1% by weight, based on the total weight of the isocyanate-reactive composition.

In certain embodiments, the isocyanate-reactive composition of the polyurethane foam-forming compositions comprises a compound, often a monomeric compound, having at least two isocyanate-reactive hydrogen atoms and a molecular weight of from 32 to 399, which can act, for example, as a chain extender. These compounds often contain from 2 to 8, such 2 to 4, isocyanate-reactive hydrogen atoms. Specific examples of which include, but are not limited to, ethanolamine, diethanolamine, triethanolamine, sorbitol and/or glycerol.

In certain embodiments, the foregoing chain extender is present in an amount of 1 to 20% by weight, such as 1 to 10% by weight, or, in some cases 5 to 10% by weight, based on the total weight of isocyanate-reactive components in the isocyanate-reactive composition. In certain embodiments, the foregoing chain extender is present in an amount such that the chain extender provides 1 to 30%, such as 10 to 30%, or, in some cases, 10 to 20% of all of the isocyanate-reactive groups present in the isocyanate-reactive composition, based on the total moles of isocyanate-reactive groups, such as —OH groups, present in the composition. Moreover, in certain embodiments, chain extender is present in an amount of at least 1% by weight, such as at least 2% by weight, such as 1 to 10% by weight, or 1 to 5% by weight, based on the total weight of the polyurethane foam-forming composition.

In certain embodiments of the present invention, the isocyanate-reactive composition also comprises water, which functions as a blowing agent. In certain of these embodiments, water is present in an amount of 0.75 to 10% by weight, such as 1 to 6% by weight, or, in some cases, 2 to 4% by weight, based on the total weight of the isocyanate-reactive composition.

A critical feature of the present invention is the presence of a $C_2$ to $C_6$ halogenated olefin in the isocyanate-reactive composition, which also functions as a blowing agent. As used herein, the term "$C_2$ to $C_6$ halogenated olefin" refers to a compound having 2 to 6 carbon atoms, at least one halogen atom, and at least one carbon-carbon double bond. In certain embodiments, the $C_2$ to $C_6$ halogenated olefin has a boiling point of at least 10° C., such as 10° C. to 40° C. or 14° C. to 40° C., at 1 atmosphere pressure.

In certain embodiments, the $C_2$ to $C_6$ halogenated olefin also comprises at least one hydrogen atom and, as such, is referred to as a hydrohalogenated olefin. In certain of these embodiments, the halogen comprises fluorine and, in such cases, the $C_2$ to $C_6$ halogenated olefin is a hydrofluoroolefin or HFO. In certain of these embodiments, the halogen also comprises chlorine and, in such cases, the $C_2$ to $C_6$ halogenated olefin is a hydrofluorochloroolefin or HFCO.

In certain embodiments, the $C_2$ to $C_6$ halogenated olefin is a compound having the structure:

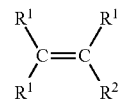

wherein each $R^1$, which may be the same or different, is chlorine, fluorine, bromine, iodine or hydrogen, $R_2$ is $(CR^1{}_2)_n X$, $X$ is $CR^1 F_2$, and n is 0, 1, 2, or 3.

In certain embodiments, the $C_2$ to $C_6$ halogenated olefin comprises a $C_3$ to $C_4$ halogenated olefin, such as a compound of the above structure in which n is 0, at least one $R^1$ is H, at least one other $R^1$ is chlorine, and X is $CF_3$. Trifluoro, monochloropropenes are examples of such compounds. Suitable trifluoro, monochloropropenes include, for example, 1,1,1,trifluoro-2,chloro-propene (HFCO-1233xf) and both cis- and trans-1,1,1-trifluoro-3-chloropropene (HFCO-1233zd). The term HFCO-1233zd herein encompasses both the cis- and trans-forms of to 1,1,1-trifluo-3, chloropropene, including various mixtures thereof. The terms "cisHFCO-1233zd" and "transHFCO-1233zd" are used herein to describe the cis- and trans-forms of 1,1,1-trifluo,3-chlororopropene, respectively. In certain embodiments, transHFCO-1233zd is predominantly (at least 90 percent by weight, based on the total weight of HFCO-1233zd) or exclusively used. Another suitable $C_2$ to $C_6$ halogenated olefin is HFO-1336mzz(Z), which is also known as cis-1,1,1,4,4,4-hexafluorobut-2-ene.

In certain embodiments, the $C_2$ to $C_6$ halogenated olefin is present in an amount of 1 to 20% by weight, such as 2 to 15% by weight, 5 to 15% by weight or, in some cases, 5 to 10% by weight, based on the total weight of the isocyanate-reactive composition.

As will be appreciated, other blowing agents, such as carbon dioxide, hydrocarbons, such as n-pentane, cyclopentane, and isopentane, and/or polyfluoroalkanes, could be used if desired.

In certain embodiments, the amount of blowing agent used in the isocyanate-reactive composition is such that the resulting foam has a density, as determined by ASTM D1622-14, of no more than 160 kg/m³, such as no more than 80 kg/m³, no more than 60 kg/m³, or, in some cases, no more than 50 kg/m³ or, in some cases, no more than 22.4 kg/m³. In some cases, such foams have a density of at least 5 kg/m³, such as at least 6.4 kg/m³, such as at least 8 kg/m³ or, in some cases, at least 10 kg/m³. In certain embodiments, the foam is a low density foam. As used herein, "low density foam" means a foam having a density, as determined by ASTM D1622-14, of 6.4 kg/m³ to 50 kg/m³.

Other ingredients can be included in the isocyanate-reactive composition used in the polyurethane foam-forming compositions of the present invention. In certain embodiments, the isocyanate-reactive composition comprises a flame retardant. Suitable flame retardants include, but are not limited to, brominated flame retardants, such as a brominated polyol and (ii) a phosphonated flame retardants, such as a halogenated, such as chlorinated, phosphates, includes mixtures thereof.

In certain embodiments, the brominated flame retardant comprises a brominated polyether polyol of the general formula:

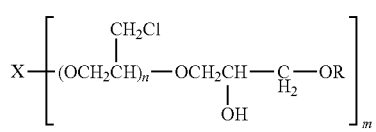

in which n is a number of 0 to 7, m is a number of 2 to 3; X is a saturated or unsaturated brominated polyol residue; and R is hydrogen or an alkyl group having 1 to 5 carbon atoms. Other suitable brominated flame retardants include, but are not limited to, 3,4,5,6-tetrabromophthalic acid, tribromoneopentyl alcohol, 1,3-propanediol, 2,2-bis(bromomethyl), and pentabromophenyl ether, among others, including mixtures of two or more thereof. Suitable commercially available brominated flame retardants also include those available from ICL Industrial Products as the SaFRon® (6000 Series) brominated flame retardants and the bromine-containing diester/ether diols of tetrabromophthalic anhydride commercially available from Albermarle Corporation. Mixtures of two or more of such brominated flame retardants can be used. In certain embodiments, the brominated flame retardant is not phosphonated, whereas in other embodiments, such as those wherein the flame retardant comprises the bromine-containing diester/ether diols of tetrabromophthalic anhydride, the flame retardant may also comprise a phosphate ester.

Specific examples of suitable phosphonates, such as halogenated phosphates, include, without limitation, tris-(2-chloroethyl)phosphate, tris-(2-chloroisopropyl)phosphate (TCPP), tris(1,3-dichloroisopropyl)phosphate, tris-(2,3-dibromopropyl)phosphate and tetrakis-(2-chloroethyl) ethylene diphosphate, Diethyl Bis-(2-hydroxyethyl)-aminomethylphosphonate, tris-(1-chloro-2-propyl) phosphate, phosphoric acid, triethyl ester, polymer with oxirane and phosphorus oxide ($P_2O_5$), triethyl phosphate, including mixtures of two or more thereof.

In certain embodiments, the relative weight ratio of brominated flame retardant and phosphonated flame retardant used in the flame retardant-containing polyether polyol composition is within the range of 1:5 to 5:1, such as 1:4 to 4:1 or 1:2 to 2:1, such as 1:1.5 to 1.5:1 or, in some cases 1.2:1 to 1:1.2 or 1.1:1 to 1:1.1. In certain embodiments, the total amount of flame retardant in the isocyanate-reactive composition is 2 to 20% by weight, such as 5 to 15% by weight, based on the total weight of the isocyanate-reactive composition.

In addition, in some embodiments, the isocyanate-reactive composition further comprises a surfactant to, for example, stabilize the foaming reaction mixture until it obtains rigidity. Such surfactants often comprise a liquid or solid organosilicon compound, a polyethylene glycol ether of a long chain alcohol, a tertiary amine, an alkanolamine salt of a long chain alkyl acid sulfate ester, an alkylsulfonic ester, or an alkylarylsulfonic acid, or a mixture thereof. Often, 0.5 to 10 parts by weight of the surfactant per 100 parts of the isocyanate-reactive composition is used.

One or more urethane catalysts are also often used in the isocyanate-reactive composition. Any suitable urethane catalyst may be used including the known tertiary amine compounds and organometallic compounds. Examples of suitable tertiary amine catalysts include, without limitation, triethylenediamine, N-methylmorpholine, pentamethyl diethylenetriamine, dimethylcyclohexylamine, tetra-methylethylenediamine, 1-methyl-4-dimethylaminoethyl-piperazine, 3-methoxy-N-dimethyl-propylamine, N-ethylmorpholine, diethylethanol-amine, N-cocomorpholine, N,N-dimethyl-N',N'-dimethylisopropyl-propylene diamine, N,N-diethyl-3-diethyl aminopropylamine and dimethyl-benzyl amine. Examples of suitable organometallic catalysts include, without limitation, organomercury, organolead, organobismuth, organozinc, organoferric and organotin catalysts. Suitable organotin catalysts include, without limitation, tin salts of carboxylic acids such as dibutyltin di-2-ethyl hexanoate and dibutyltin dilaurate. Metal salts such as stannous chloride can also function as catalysts for the urethane reaction. A catalyst for the trimerization of polyisocyanates, such as an alkali metal alkoxide or carboxylate, or certain tertiary amines may also optionally be employed herein. Such catalysts are used in an amount which measurably increases the rate of reaction of the polyisocyanate. Typical amounts are 0.1 to 10.0 part of catalyst per 100 parts by weight of polyol. Examples of such catalysts include the potassium salts of carboxylic acids such as potassium octoate, and the tertiary amine N,N',N"-tris(3-dimethylaminopropyl) hexahydro-s-triazine.

Other suitable ingredients, if desired, include reaction retarders, cell regulators, emulsifiers, foam stabilizers, colorants, such as pigments and dyes, and fillers, such as, but not limited to, barium sulfate and calcium carbonate.

As indicated earlier, the polyurethane-foam forming composition described herein can be particularly suitable for use in SPF applications. As a result, certain embodiments of the present invention are directed to methods for producing a polyurethane foam. In some embodiments, these methods comprise: (a) impingement mixing a polyurethane foam-forming composition as described above in a spray gun; and (b) spraying the mixture onto a surface. In certain embodiments, the resulting foam is a rigid foam which can be particularly suitable for use as insulating foam in architectural (wall and roofing), automotive, appliance, and other applications. As such, in certain embodiments, the substrate used in the methods of the present invention is embodied as a building component, such as a wall, floor, or ceiling.

In certain embodiments of the methods of the present invention, the polyisocyanate and isocyanate-reactive composition are combined in a relative volume ratio of 1.5:1 to 1:1.5, such as 1.1:1 to 1:1.1. In certain embodiments of the methods of the present invention, the polyisocyanate and isocyanate-reactive composition are combined in relative amounts such that the NCO Index (ratio of isocyanate groups to isocyanate-reactive groups multiplied by 100) is 50 to 300, such as 50 to 200, 70 to 150, 90 to 150, 90 to 135, or, in some cases 100 to 135 or 100 to 120.

Certain embodiments of the present invention are also directed to the resulting foams having, for example, a density as described above. In certain embodiments, the resulting foams are closed cell foams, which, as used herein, means that the foam has a closed cell content of at least 80% by volume, such as at least 85% by volume, or at least 90% by volume, measured according to ISO 4590:2002.

In certain embodiments, the polyurethane-foam forming compositions described herein form a foam having a Class B rating (flame spread index of 26-75), determined according to the ASTM E 84 test. In other embodiments, however, the polyurethane-foam forming compositions described herein form a foam having a Class A rating (flame spread index of no more than 25 and smoke development index of no more than 450), determined according to the ASTM E 84 test.

The polyurethane foams described herein are useful in a wide range of applications. In some cases, the foams are used on a building substrate, such as a wall, floor, or ceiling. In other cases, the foams can be used for appliances, board stock, or laminates.

The following Examples are given as being illustrative of the present invention. All parts and percentages given in these Examples are parts by weight and percentages by weight, unless otherwise indicated.

EXAMPLES

Examples 1-12

Polyol blends were prepared using the ingredients and amounts (parts by weight) listed in Table 1 below. To prepare the polyol blends, all components other than the blowing agent were added to a suitable container and mixed. The mixture was then cooled down to 10° C. prior to adding the blowing agents. After the blowing agent was added, the completed polyol blends were then transferred to a 350 ml glass pressure vessel. The charge weight was 375 grams of polyol blend per vessel.

The vessels were then placed in an oven at 50° C. Prior to making the cup test at the predetermined time, the vessels and materials were cooled down to 23° C. prior to foaming of the cup tests. The vessels were visually observed for any phase separation or globules that may have been present and noted.

The cup tests were done using a 975 ml (quart) paper cup. 45.2 grams of polyol were mixed with 54.8 grams of Mondur® MR Light (a polymeric diphenylmethane diisocyanate (pMDI) having a NCO content of at least 31.0%, a viscosity of 150 to 250 mPa·s @ 25° C.; an average equivalent weight of 132 and a functionality of 2.8 commercially available from Covestro LLC). Reactivity times (gel, top of cup, end of rise) were recorded. After the foams cooled, the top of the cups were cut off to obtain the density of the foams. Results are set forth in Table 1. Examples 1, 3, 5, 7, 9, and 11 are inventive examples and Examples 2, 4, 6, 8, 10 and 12 are comparative examples.

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| POLYOL 1[1] | 50.68 | — | 50.68 | — | 50.68 | — | 50.68 | — | 50.68 | — | 50.68 | — |
| POLYOL 2[2] | 12.67 | — | 12.67 | — | 12.67 | — | 12.67 | — | 12.67 | — | 12.67 | — |
| POLYOL 3[3] | — | 63.35 | — | 63.65 | — | 63.35 | — | 63.65 | — | 63.35 | — | 63.65 |
| TEOA[4] | 5.59 | 5.59 | 5.59 | 5.59 | 5.59 | 5.59 | 5.59 | 5.59 | 5.59 | 5.59 | 5.59 | 5.59 |
| Bi/Zn based catalyst | 0.3 | 0.3 | 0.3 | 0.3 | — | — | 0.3 | 0.3 | — | — | — | — |
| Bi Catalyst | — | — | — | — | 0.3 | 0.3 | — | — | 0.3 | 0.3 | — | — |
| POLYOL 4[5] | 6.50 | 6.50 | 6.5 | 6.5 | 6.50 | 6.50 | 6.5 | 6.5 | 6.50 | 6.50 | 6.5 | 6.5 |
| Ethylene glycol monobutyl ether | 1.50 | 1.50 | 1.5 | 1.5 | 1.50 | 1.50 | 1.5 | 1.5 | 1.50 | 1.50 | 1.5 | 1.5 |
| TCPP | 5.00 | 5.00 | 5 | 5 | 5.00 | 5.00 | 5 | 5 | 5.00 | 5.00 | 5 | 5 |
| Saytex ® RB-7980[6] | 5.00 | 5.00 | 5 | 5 | 5.00 | 5.00 | 5 | 5 | 5.00 | 5.00 | 5 | 5 |
| Silstab ® 2100[7] | 1.30 | 1.30 | 1.3 | 1.3 | 1.30 | 1.30 | 1.3 | 1.3 | 1.30 | 1.30 | 1.3 | 1.3 |
| Dabco ® 2041[8] | 1.05 | 1.05 | — | — | — | — | — | — | — | — | — | — |
| Dabco ® 204[8] | — | — | — | — | 1.04 | 1.04 | — | — | — | — | 1.04 | 1.04 |
| Water (added) | 1.16 | 1.16 | 1.16 | 1.16 | 1.16 | 1.16 | 1.16 | 1.16 | 1.16 | 1.16 | 1.16 | 1.16 |
| Solstice LBA | 8.00 | 8.00 | 8.00 | 8.00 | 8.00 | 8.00 | 8.00 | 8.00 | 8.00 | 8.00 | 8.00 | 8.00 |
| Before aging | clear | clear | clear | clear | clear | clear | clear | clear | clear | clear | clear | clear |
| After aging 7 days | clear | Cloudy/gel | clear | Cloudy/gel | clear | Cloudy/gel | clear | Cloudy/gel | clear | Cloudy/gel | clear | Cloudy/gel |
| After aging 14 days | clear | Cloudy/gel | clear | Cloudy/gel | clear | Cloudy/gel | clear | Cloudy/gel | clear | Cloudy/gel | clear | Cloudy/gel |
| Cream, seconds | 8 | 8 | 15 | 15 | 6 | 5 | 5 | 5 | 10 | 15 | 11 | 11 |
| Top of cup, seconds | 14 | 13 | 53 | 48 | 10 | 9 | 12 | 11 | 73 | 62 | 30 | 26 |
| End of rise, seconds | 30 | 26 | 125 | 92 | 26 | 21 | 28 | 30 | 153 | 129 | 58 | 53 |
| Free rise density, lb/ft³ | 2.3 | 2.47 | 2.85 | 2.72 | 2.3 | 2.33 | 2.22 | 2.33 | 3.05 | 3.05 | 2.16 | 2.26 |

[1] A phthalic anhydride based polyester polyol having a hydroxyl number of 290-310 mg KOH/gram polyol, a theoretical functionality of 2.1, and an average equivalent weight of 187, commercially available from Stepan Company.

[2] A phthalic anhydride based polyester polyol having a hydroxyl number of 340-360 mg KOH/gram polyol, a theoretical functionality of 2.4, and an average equivalent weight of 160, commercially available from Stepan Company.

[3] Aromatic terephthalate based polyester polyol having a hydroxyl number of 285-305 mg KOH/gram polyol and a theoretical functionality of 2.4, commercially available from Huntsman Cooperation

[4] triethanolamine (85% solution with water).

[5] 625 molecular weight sucrose-based polyether polyol, hydroxyl number of 450-490 mg KOH/gram polyol, commercially available from Covestro LLC

[6] flame retardant from Albemarle Corporation.

[7] non-hydrolyzable block copolymer of dimethylsiloxane and a polyoxyalkylene, from Siltech Corporation.

[8] amine catalyst from Air Products and Chemicals, Inc.

Examples 13-14

The following examples demonstrate the anticipated advantage of using polyurethane foam-forming composition of the type described in this specification in spray foam applications to manufacture thick parts with no scorch due to lower exotherm.

Polyol blends could be prepared using the ingredients and amounts listed in Table 2 below using the procedure described for Examples 1-12. The polyol blends could be spray applied to an oriented strand board (OSB) substrate that is framed with 2×4 dimensional lumber wall studs using a Graco E-30 spray rig with 60 feet of heated hose using a Graco Fusion Air Purge spray gun equipped with a 42/42 mix chamber, using a mix ratio of 1:1 by volume with Mondur® MR Light (a polymeric diphenylmethane diisocyanate (pMDI) having a NCO content of at least 31.0%, a viscosity of 150 to 250 mPa·s @ 25° C.; an average equivalent weight of 132 and a functionality of 2.8 commercially available from Covestro LLC). The following parameters could be used in the spray operation: Temperature of resin and isocyanate: 85° F.; Temperature of polyol blend and isocyanate in machine: 125° F.; Temperature of machine hose: 125° F.; Set pressures of polyol blend and isocyanate in machine: 1500 psi. Predicted results are set forth in Table 2. Example 13 is an inventive example and Example 14 is a comparative example.

TABLE 2

| Example | 13 | 14 |
|---|---|---|
| POLYOL 1[1] | 50.68 | — |
| POLYOL 2[2] | 12.67 | — |
| POLYOL 3[3] | — | 63.35 |
| TEOA[4] | 5.59 | 5.59 |
| POLYOL 4[5] | 6.50 | 6.50 |
| Ethylene glycol monobutyl ether | 1.50 | 1.50 |
| TCPP | 5.00 | 5.00 |
| Saytex ® RB-7980[6] | 5.00 | 5.00 |
| Silstab ® 2100[7] | 1.30 | 1.30 |
| Dabco ® 2041[8] | 1.05 | 1.05 |
| Dabco ® 204[8] | 1.05 | 1.05 |
| Dabco ® T120 | 0.50 | 0.50 |
| Dabco ® 218[8] | 0.25 | 0.25 |
| Water (added) | 1.16 | 1.16 |
| Solstice LBA | 8.00 | 8.00 |
| Total water adjusted to | 2.0 | 2.0 |
| Average Max. Exotherm Temp on 4" thick wall (° F.)[9] | 298 | 322 |

[9]four thermal couples equally spaced within a 24 inch area

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112, first paragraph, and 35 U.S.C. § 132(a).

What is claimed is:

1. A polyurethane foam-forming composition comprising:
   (a) an isocyanate-reactive composition comprising:
      (1) at least 50% by weight, based on the total weight of the isocyanate-reactive composition, of a phthalic anhydride based polyester polyol component;
      (2) water; and
      (3) a $C_2$ to $C_6$ halogenated olefin,
   wherein the isocyanate-reactive composition exhibits no visible cloudiness or gels after aging the isocyanate-reactive composition for 7 days at 50° C.; and
   (b) a polyisocyanate,
   wherein the phthalic anhydride based polyester polyol component comprises a mixture of two or more phthalic anhydride based polyester polyols comprising:
      (i) a first phthalic anhydride based polyester polyol having a hydroxyl number of 290 to 310 mg KOH/gram polyol and a OH functionality of 2.0 to 2.2, and
      (ii) a second phthalic anhydride based polyester polyol having a hydroxyl number of 340 to 360 mg KOH/gram polyol and a OH functionality of 2.3 to 2.5.

2. The foam-forming composition of claim 1, wherein:
   (i) is present in an amount of 50% to 99% by weight, based on the combined weight of (i) and (ii); and
   (ii) is present in an amount of 1% to 50% by weight, based on the combined weight of (i) and (ii).

3. The foam-forming composition of claim 1, wherein the phthalic anhydride based polyester polyol component is present in an amount of at least 60% by weight, based on the total weight of the isocyanate-reactive composition.

4. The foam-forming composition of claim 1, wherein the isocyanate-reactive composition further comprises a sucrose-based polyether polyol having a hydroxyl number of 400 to 800 mg KOH/gram polyol and an OH functionality of 5.0 to 7.0.

5. The foam-forming composition of claim 4, wherein the sucrose-based polyether polyol is present in an amount of 1 to 20% by weight, based on the total weight of the isocyanate-reactive composition.

6. The foam-forming composition of claim 1, wherein the $C_2$ to $C_6$ halogenated olefin comprises a hydrofluorochloroolefin.

7. The foam-forming composition of claim 6, wherein the hydrofluorochloroolefin comprises 1,1,1-trifluoro-3-chloropropene (HFCO-1233zd).

8. A method of making a low density, polyurethane foam comprising:
   (a) impingement mixing the foam-forming composition of claim 1 in a spray gun; and
   (b) spraying the mixture onto a surface.

9. A polyurethane foam-forming composition comprising:
   (a) an isocyanate-reactive composition comprising:
      (1) at least 50% by weight, based on the total weight of the isocyanate-reactive composition, of a phthalic anhydride based polyester polyol component;
      (2) water; and
      (3) a $C_2$ to $C_6$ halogenated olefin; and
   (b) a polyisocyanate,
   wherein the phthalic anhydride based polyester polyol component comprises a mixture of two or more phthalic anhydride based polyester polyols comprising:
      (i) a first phthalic anhydride based polyester polyol having a hydroxyl number of 290 to 310 mg KOH/gram polyol and a OH functionality of 2.0 to 2.2, and
      (ii) a second phthalic anhydride based polyester polyol having a hydroxyl number of 340 to 360 mg KOH/gram polyol and a OH functionality of 2.3 to 2.5.

10. The foam-forming composition of claim 9, wherein:
(i) is present in an amount of 50% to 99% by weight, based on the combined weight of (i) and (ii); and
(ii) is present in an amount of 1% to 50% by weight, based on the combined weight of (i) and (ii).

11. The foam-forming composition of claim 9, wherein the phthalic anhydride based polyester polyol component is present in an amount of at least 60% by weight, based on the total weight of the isocyanate-reactive composition.

12. The foam-forming composition of claim 9, wherein the isocyanate-reactive composition further comprises a sucrose-based polyether polyol having a hydroxyl number of 400 to 800 mg KOH/gram polyol and an OH functionality of 5.0 to 7.0.

13. The foam-forming composition of claim 12, wherein the sucrose-based polyether polyol is present in an amount of 1 to 20% by weight, based on the total weight of the isocyanate-reactive composition.

14. The foam-forming composition of claim 9, wherein the $C_2$ to $C_6$ halogenated olefin comprises a hydrofluorochloroolefin.

15. The foam-forming composition of claim 14, wherein the hydrofluorochloroolefin comprises 1,1,1-trifluoro-3-chloropropene (HFC0-1233zd).

16. A method of making a low density, polyurethane foam comprising:
(a) impingement mixing the foam-forming composition of claim 9 in a spray gun; and
(b) spraying the mixture onto a surface.

17. Building wall or roof insulation comprising foam formed by the method of claim 16.

* * * * *